Inventor
D. B. Delanoy
By
Holcombe, Wetherill & Brisebois
Attorneys

AUTOMATIC TELEPHONE SYSTEMS

Filed May 22, 1961 9 Sheets-Sheet 2

Inventor
D.B. Delanoy
By
Holcombe, Wetherill & Brisebois
Attorneys

Inventor
D. B. Delanoy
By Holcombe, Wetherill & Brisebois
Attorneys

June 29, 1965 D. B. DELANOY 3,192,324

AUTOMATIC TELEPHONE SYSTEMS

Filed May 22, 1961 9 Sheets-Sheet 4

Inventor
D. B. Delanoy
By Holcombe, Wetherill & Brisebois
Attorneys

*Inventor*

D. B. Delanoy

By

Attorneys

Inventor
D. B. Delanoy
By Holcombe, Wetherill & Brisebois
Attorneys

Inventor
D.B. Delanoy
By
Holcombe, Wetherill & Brisebois
Attorneys

June 29, 1965 D. B. DELANOY 3,192,324

AUTOMATIC TELEPHONE SYSTEMS

Filed May 22, 1961 9 Sheets-Sheet 8

Inventor
D.B. Delanoy
By Holcombe, Wetherill & Brisebois
Attorneys

June 29, 1965 D. B. DELANOY 3,192,324

AUTOMATIC TELEPHONE SYSTEMS

Filed May 22, 1961 9 Sheets-Sheet 9

*Inventor*
D. B. Delanoy
By
Holcombe, Wetherill & Brisebois
Attorneys 3,192,324
Patented June 29, 1965

3,192,324
AUTOMATIC TELEPHONE SYSTEMS

Donald Brian Delanoy, Cambridge, England, assignor to Pye Limited, Cambridge, England, a British company Filed May 22, 1961, Ser. No. 111,758
Claims priority, application Great Britain, May 25, 1960, 18,470/60
3 Claims. (Cl. 179—18)

The present invention relates to automatic telephone systems and more particularly to such systems in which the exchange circuits are electronically operated and employ cold cathode gas discharge tubes.

The present invention consists in an automatic telephone system wherein plural links are provided to each of which any two subscribers telephones can be selectively connected to provide a communication channel between them over that link wherein the speech circuit for each subscribers telephone is connected to each of the links through a separate cold cathode gas discharge tube and the arrangement is such that upon any subscriber commencing to call another subscriber, for example by the calling subscriber lifting his telephone hand set, the tube connecting the speech circuit of the calling subscribers telephone to one of the links strikes and upon the called subscribers telephone number or other identifying code being dialed, the tube connecting the speech circuits of the called subscribers telephone to the same link strikes, thereby completing the speech circuits between the subscribers through the two struck tubes when the called subscriber answers the call, for example by lifting his hand set.

According to a feature of the invention, each subscriber is connected to a line unit including a plurality of cold cathode gas discharge tubes, one of which is connected to each link, and each of these tubes has two trigger electrodes. One of the trigger electrodes of each tube is primed at intervals by the action of an allotting circuit and when one subscriber lifts his hand set to call another subscriber, he causes an alteration of potential across the tubes connected to the links, so that the first tube which is primed by the allotting circuit after he has lifted his hand set will then strike to connect the calling subscriber to one of the links. The other trigger of each of the tubes connected to the links receives a potential which is sufficient to strike the tube when the subscriber connected thereto is being called by another subscriber.

The allotting circuit preferably consists of a ring counter comprising a number of cold cathode gas discharge tubes equal to the number of links in the exchange, each of which tubes controls the priming of all of the tubes which serve to connect all the subscribers to any one link through a clamping diode.

A busy circuit is also provided to prevent a subscriber attempting to make a call from being connected to any of the links when they are all already engaged, and for indicating to that subscriber that all the links are engaged.

In order to handle the dialling impulses, a plurality of registers are provided for each link, each register employing cold cathode gas discharge tubes. In practice, for an exchange capable of handling up to 80 subscribers, each subscriber is allocated a number consisting of two digits, but the digit 1 is never used as the first digit. By this means the chances of spurious pulses causing interference with the exchange circuits and possibly being effective to ring a subscriber is substantially eliminated. In order to handle the dialling impulses representing the two digits of each number, two registers are provided for each link. The first register is provided with a number of outputs equal to the number of digits employed for the first digit of each number. The second register is divided into a number of similar sections or levels, equal to the number of digits employed for the first digit of the subscribers numbers, and one level is connected to each of the outputs from the first register. Each level produces ten outputs representing the ten unit digits 0 to 9 which form the second digit of the numbers whose first digit is represented by the associated output from the first register.

To handle numbers having more than two digits additional registers are necessary but the principle of operation remains the same.

According to a further feature of the invention all of the tubes connecting the various subscribers to any one link have their anodes connected to a common coupling circuit including a sense point whose potential varies to different levels according to successive conditions existing in the circuits during the sequence of operations taking place when one subscriber attempts to call another subscriber.

The potential of this sense point is in turn applied to a link control circuit. This link control circuit serves to control the circuits connected to that link during the period between one subscriber lifting his hand set to commence to call another subscriber and the termination of that call, or of the calling subscribers attempt to communicate with the other subscriber.

The link control circuit includes means which become operative when a subscriber lifts his hand set and seizes a link to prevent any other subscriber from seizing that link to make a call, and further means operative at the termination of a call, or upon the calling subscriber ceasing to attempt to call another subscriber, to release the subscriber or both subscribers line units and also to free the link for use by any other subscriber. The link control circuit is fed with two reference or gate potentials which condition two parts of the circuit respectively to operate at instants determined by potential variations at the sense point during the sequence of operations taking place when one subscriber attempts to call another subscriber.

The telephone system is intended to operate with normal types of telephones in which the microphone is connected to the line by the closing of contacts when the hand set is lifted, although any other type of subscribers terminal unit may be employed which can perform the same functions. For example the subscribers unit may incorporate an amplifier and loudspeaker for the reproduction of another subscribers conversation, and/or an amplifier connected to the microphone for amplifying the calling subscribers conversation. Each telephone or equivalent subscribers unit also incorporates a dialling impulse mechanism for transmitting dialling impulses representing the number of a subscriber to be called to the register circuits of the exchange.

In order that the invention may be more fully understood reference will now be made to the accompanying drawings in which.

Figure 1:
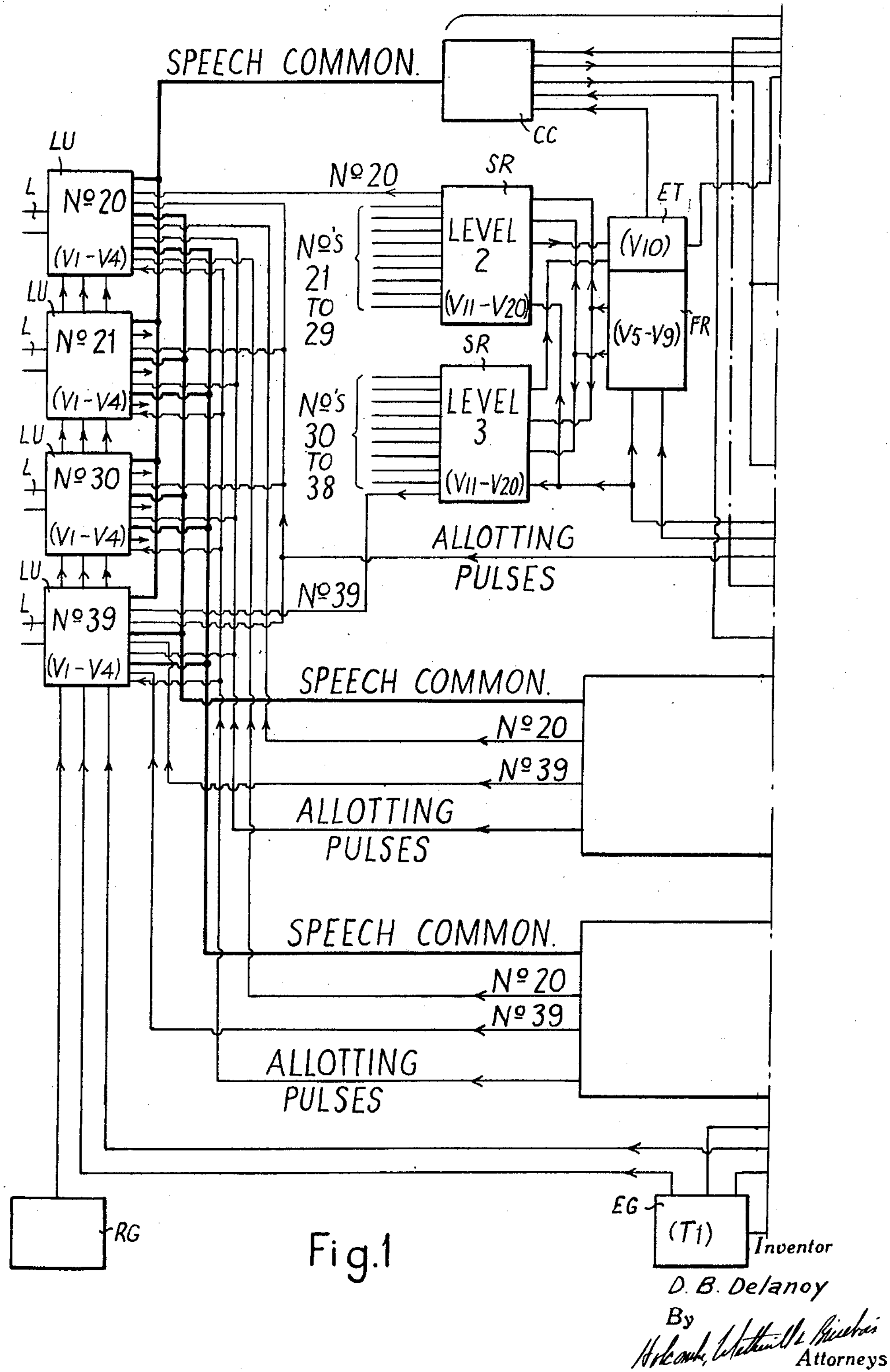
FIGURES 1 and 1A are a block circuit diagram of one embodiment of automatic telephone system according to this invention.
Figure 1A:
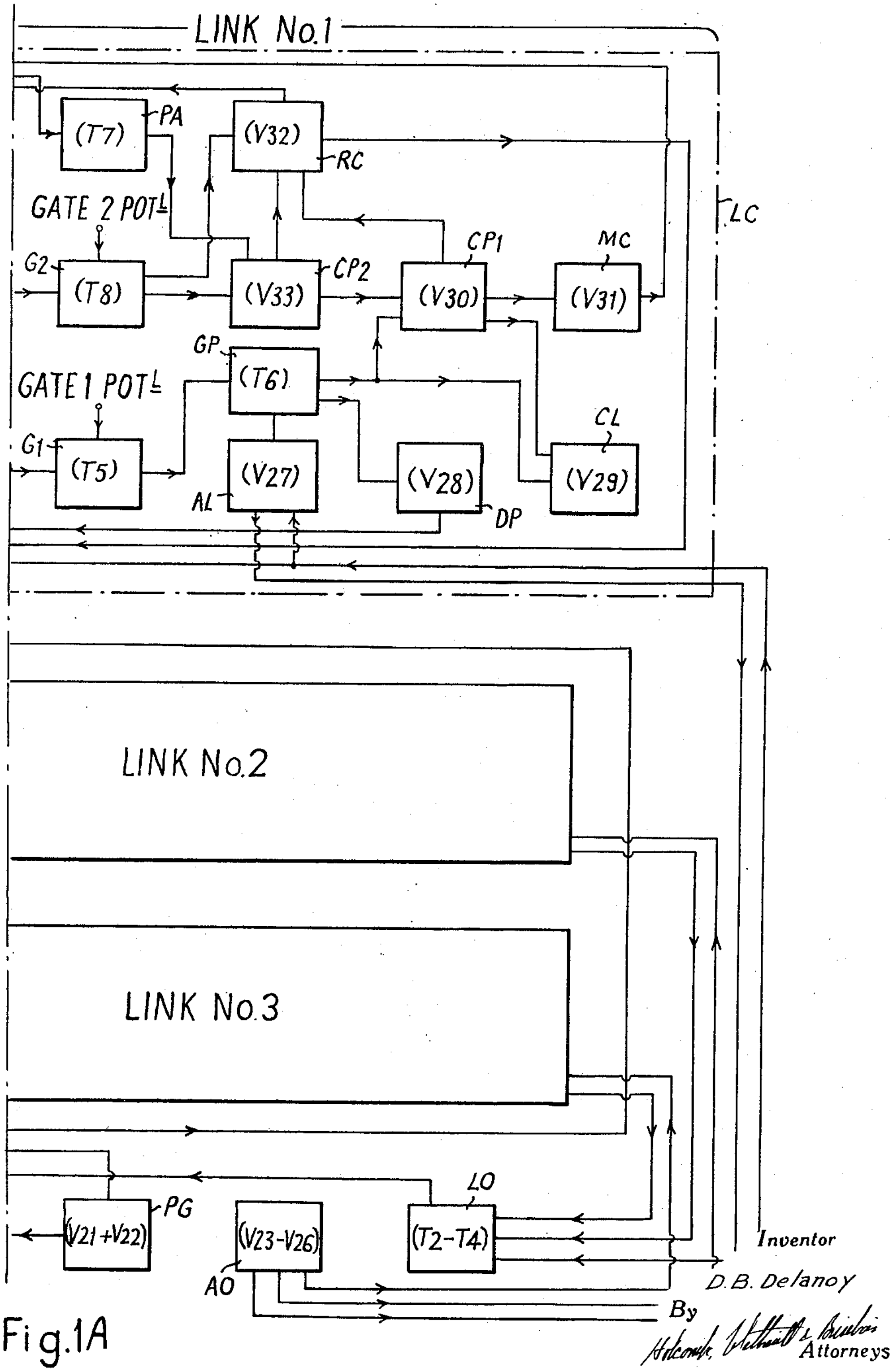

The embodiment of the telephone system according to this invention illustrated in FIGURES 1 and 1A consists of a twenty line exchange having three links or speech circuits over which conversation may be carried out between any of the twenty subscribers connected to the exchange. Only link No. 1 has been shown in detail but it will be understood that the circuitry for link No. 2 and link No. 3 is similar to that shown for link No. 1. Also in the interests of clarity only four of the twenty line units LU connected to the subscribers telephones, via lines L, have been shown.

Each of the subscribers is allocated a number having two digits and in order substantially to eliminate the risk of operation of the exchange circuits by spurious pulses the digit 1 is not used as the first digit for any of the subscribers numbers. In this embodiment therefore the twenty subscribers are given two decades of numbers 20 to 29 and 30 to 39. Only the line units for subscribers numbers 20, 21, 30 and 39 have been shown and of these units, only numbers 20 and 39 show the connections from the outputs of the second registers.

The three separate links each include a coupling circuit CC common to all the line units and also a link control circuit LC. In order to handle the dialling impulses, each link also comprises a first register FR and a second register SR, the latter having two similar sections respectively designated "level 2" and "level 3." The first register determines which of the levels of the second register shall be primed in dependence upon the first digit dialed. Thus if the first digit is 2, then level 2 of the second register is primed to respond to the dialling impulses of the second digit, whilst if the first digit is a 3 then the first register primes level 3 of the second register to respond to the dialling pulses of the second digit. The ten outputs from level 2 of the second register are fed to the line units for the subscribers numbered 20 to 29 and the ten outputs from level 3 of the second register are fed to the line units for the subscribers numbered 30 to 39.

The coupling circuit includes a sense resistor and changes in potential across this resistor occasioned by changes in potential on the links during the sequence of operations of one subscriber calling another, as well as during the ringing off of both subscribers at the termination of a call, are applied to the link control circuit LC to control the function of the exchange circuitry.

Two gate potentials serving as reference potentials and respectively designated gate 1 and gate 2 are applied to the link control circuit to assist in controlling its functioning. Briefly, the link control circuit includes a first gate amplifier G1 fed with the gate 1 potential and also with variations in potential from the sense resistor and itself feeding a gate pulse inverter stage GP which in turn feeds a dial pulse shaping stage DP feeding the dialling pulses to the first and second registers. The gate pulse inverter stage GP also feeds an output to the allotter and busy control stage AL. An output from the gate pulse inverter GP is also fed to a clearing pulse amplifier CP1 and to a clamp circuit CL. The output from the clearing pulse amplifier CP1 is fed to the clamp circuit, the main clearing circuit MC and a register clearing tube RC. The output of the main clearing circuit MC is fed to release the link at the end of a call and the register clearing circuit RC is fed to clear the registers and also to the engaged tone control circuit ET which controls the feeding of the engaged tone to a calling subscriber if the number he is calling is engaged. The gate 2 circuit G2, is fed with the gate 2 potential and also with variations in potential from the sense resistor in the coupling circuit and feeds an output to the clearing pulse amplifier CP2 which in turn operates the register clearing tube RC.

The positive pulse amplifier PA amplifiers positive going potentials from the coupling circuit CC and feeds them to the clearing pulse amplifier CP2.

The exchange also includes a ringing generator RG for supplying ringing current to each of the twenty line units, as well as an engaged tone generator EG and a ringing pattern generator PG which also supply their outputs to each of the twenty line units. The output from the engaged tone generator EG is applied via each coupling circuit CC for feeding to a calling subscriber if a called subscriber is engaged. The application of the engaged tone to a subscriber via the connection to his line unit is controlled by the busy circuit LO when all the links are engaged. Finally the allotter circuit AO allows each of the subscribers units LU to be primed in turn to condition these units for connection to the three links in sequence.

It will be understood that the above description given in connection with FIGURES 1 and 1A only constitutes a brief outline description of one embodiment of the system, and the various circuits forming the system will hereinafter be described in detail in order that the precise nature of working of the invention may become clearly apparent. The various blocks or sections of FIGURES 1 and 1A also indicate the valves V and/or transistors T included therein and which form elements of the circuits now to be described in detail.

*Line unit*

Figure 2:
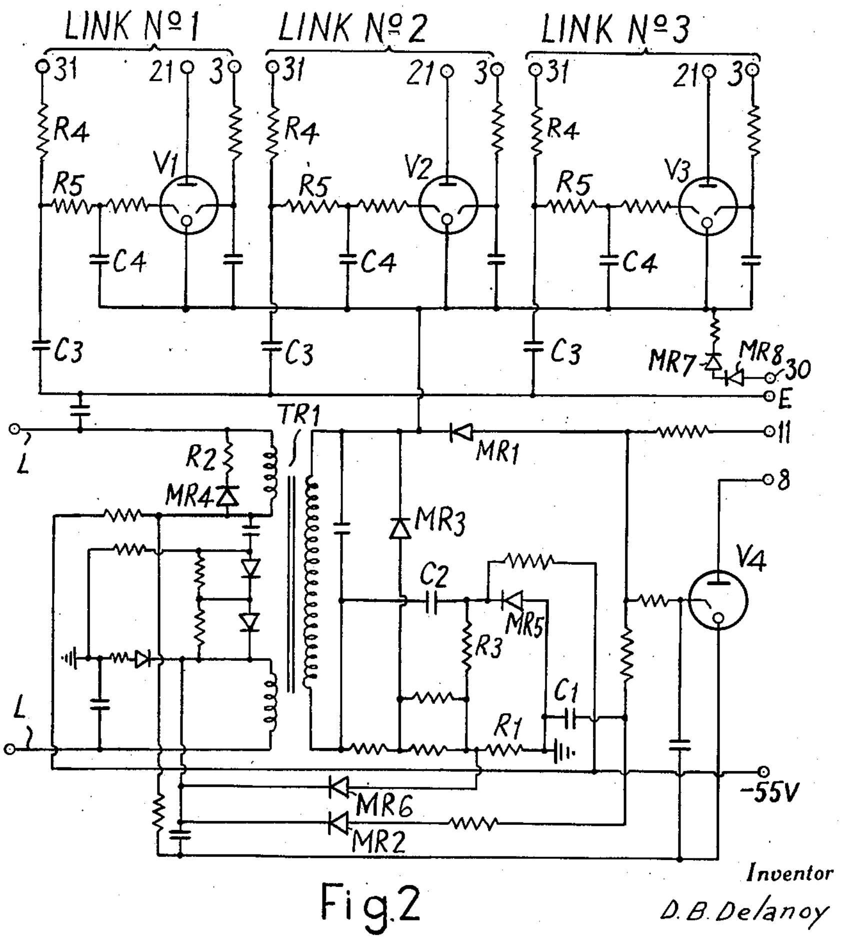
FIGURE 2 is a circuit diagram of a subscribers line unit.

FIGURE 2, shows the circuit of one of the twenty line units which are provided in order to connect each of the twenty subscribers to each of the three links. Each of the line units consists primarily of three cold cathode gas discharge tubes V1, V2, and V3 and a coupling transformer TR1. The subscribers telephone is connected by means of the lines L to the primary of the transformer TR1, the secondary of which is connected to the cathodes of the three tubes V1, V2 and V3. The anodes of these tubes are respectively connected one to each link and the associated coupling circuit (FIGURE 3) through terminal 21 and hence also to the anodes of the corresponding tube on each of the other nineteen line units.

The manner of operation of tube V1 connected to link No. 1 will now be described, it being understood that tubes V2 and V3 connected respectively to link No. 2 and link No. 3 operate in a similar manner. The right hand trigger (as viewed in the drawing) of tube V1 is primed sequentially with the corresponding triggers of tubes V2 and V3 by means of pulses fed from the link allotter (see FIGURE 7) via terminal 3. The right hand triggers of the corresponding tubes in each of the line units are connected in parallel so that all the tubes in the line units connected to link No. 1 are primed, then all the tubes connected to link No. 2, then all the tubes connected to link No. 3, and so on in sequence. The left hand trigger of tube V1 receives, via terminal 31, an output pulse from the second register (see FIGURE 5) when the subscriber connected to this line unit is being rung by another subscriber and is free to take an incoming call. The amplitude of the pulse applied to terminal 31 is sufficient to strike the tube.

When a subscriber desires to make a call, he lifts his hand set and so completes the circuit through the primary of transformer TR1 and the telephone lines L thereby causing current to flow round this circuit and hence a corresponding voltage drop which reduces the potential at the cathodes of V1, V2 and V3 to about −30 volts. This change in potential is such that when the next priming pulse is received on the right-hand trigger of any one of tubes V1, V2 and V3, the primed tube will strike and thereby connect the calling subscriber to one of the links. Upon striking, the cathode potential of the tube rises to about +50 volts and as the cathodes of the other two tubes also rise, the allotter priming potential is now insufficient to strike these other tubes. During the subsequent dialling of a number when the loop through the primary of TR1 is broken, the tube which has been struck is held conducting through resistor R1.

Figure 6:
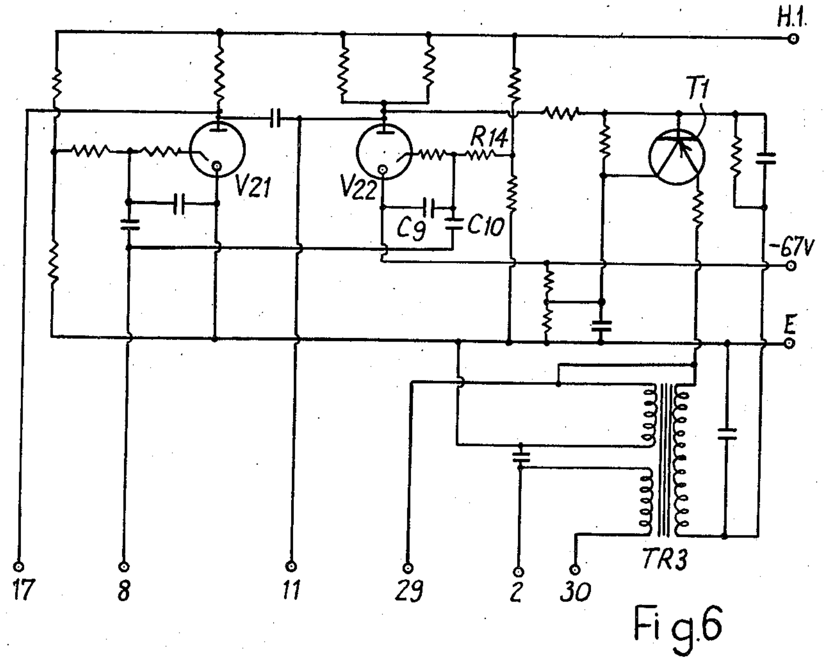
FIGURE 6 is a circuit diagram of the tone and pattern generators.

Tube V4 controls the feeding of ringing current to ring the telephone of the subscriber when he is being called by another subscriber. The anode of this tube is connected to terminal 8 which is fed with a seventeen cycle per second ringing current superimposed on a positive D.C. voltage. A pulse train forming the ringing pattern and having a period of one second on, one second off, is applied to the trigger of tube V4 through terminal 11 from the tone and pattern generators (FIGURE 6). The diode MR1 in series with the trigger of V4 normally clamps the trigger to earth when the subscribers hand set is on its rest. However, when the subscriber is being rung, one of the link tubes V1, V2 or V3 will have struck raising the cathode potential of rectifier MR1 to cut it off thereby unclamping the trigger of V4 and allowing the ringing pattern to strike the tube and pass the ringing current over the telephone line L to ring the called subscribers telephone bell. When the called subscriber picks up his hand set to answer the call, diode MR2 conducts to feed a negative voltage to the trigger of tube V4 to prevent it passing any more ringing current. At the same time capacitor C1 is charged up to a negative potential so that when the subscriber replaces his hand set at the end of a call, the negative charge on condenser C1 applied to the trigger of tube V4 is sufficient to hold the tube non-conducting until the exchange circuits are cleared.

Diode MR3 operates to suppress negative dialling impulses and transients but not speech, whilst diode MR4 in series with resistor R2 serves to suppress positive transients on dialing but is backed off for speech frequencies by the voltage across the transformer. Diode MR5 condenser C2 and resistor R3 form a network to prevent oscillation if a tube happens to operate upon the negative resistance portion of its characteristic. Condenser C2 additionally decouples the resistors in series with the secondary of transformer TR1 for speech frequencies when the hand set is lifted.

Diode MR6 blocks off the positive excursions of ringing current to prevent the operation of the transistor inverter stage T7 in the link control circuit, (FIGURE 9) which is connected via terminal 6 to the coupling circuit, so as to prevent the release circuit V30, V31 and V33 in the link control circuit operating on ringing current.

The network R4, R5, C3, C4 connected to the left hand trigger of each of tubes V1, V2 and V3 form a time constant to prevent anode/trigger breakdown of these tubes at the end of a call when a subscriber replaces his hand set and also prevents the unwanted tubes from striking as the dialling pulses pass them during dialling.

Figure 8:
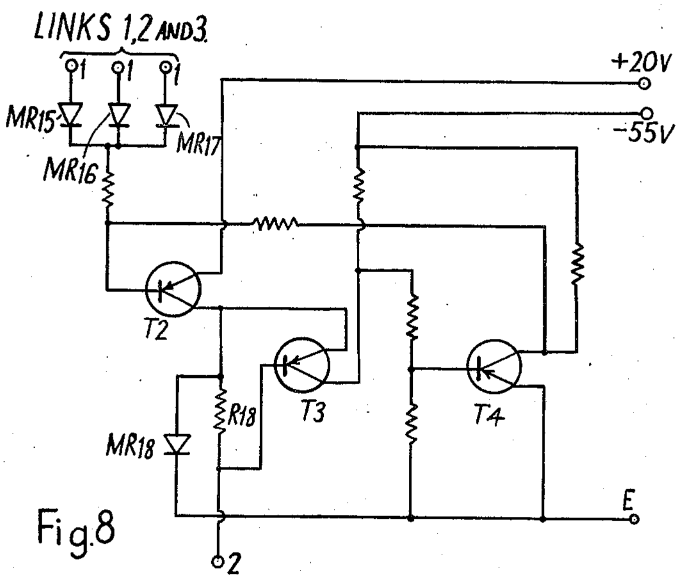
FIGURE 8 is a diagram of the busy circuit.

Diodes MR7 and MR8 are normally biassed off by the positive voltage at the cathodes of the tubes V1, V2 and V3 when one of the tubes is struck, so as to prevent the feeding of the engaged tone to a subscriber through these diodes whilst he is connected to one of the links. The diodes however conduct to feed the engaged tone to a subscriber if all the links are engaged, as will be described in connection with the busy circuit (FIGURE 8).

*Coupling circuit*

Figure 3:
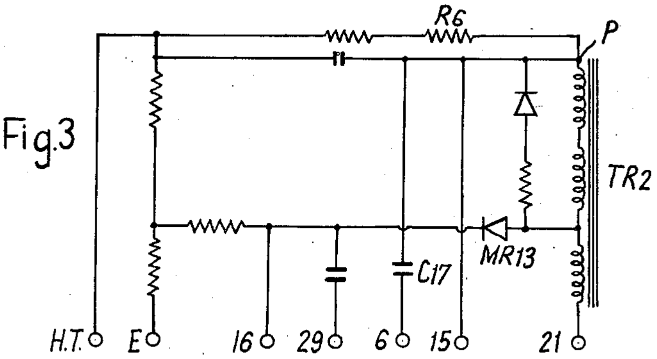
FIGURE 3 is a diagram of a coupling circuit.

The coupling circuit is shown in FIGURE 3. One such coupling circuit is provided for each of the three links and includes a resistor R6, known as the sense resistor, in series with a transformer TR2 through which high tension is applied via terminal 21 to the anodes of those tubes in the subscribers line units which form the speech circuit connections to the associated link. The junction of resistor R6 and transformer TR2 is designated the sense point P. The coupling circuit is also connected to the first register (FIGURE 4) through terminal 16, to the tone and pattern generators (FIGURE 6) through terminal 29 and to the link control unit (FIGURE 9) through terminals 6 and 15. Other components of the coupling circuit will be referred to hereinafter in connection with the description of other parts of the system.

*First register*

Figure 4:
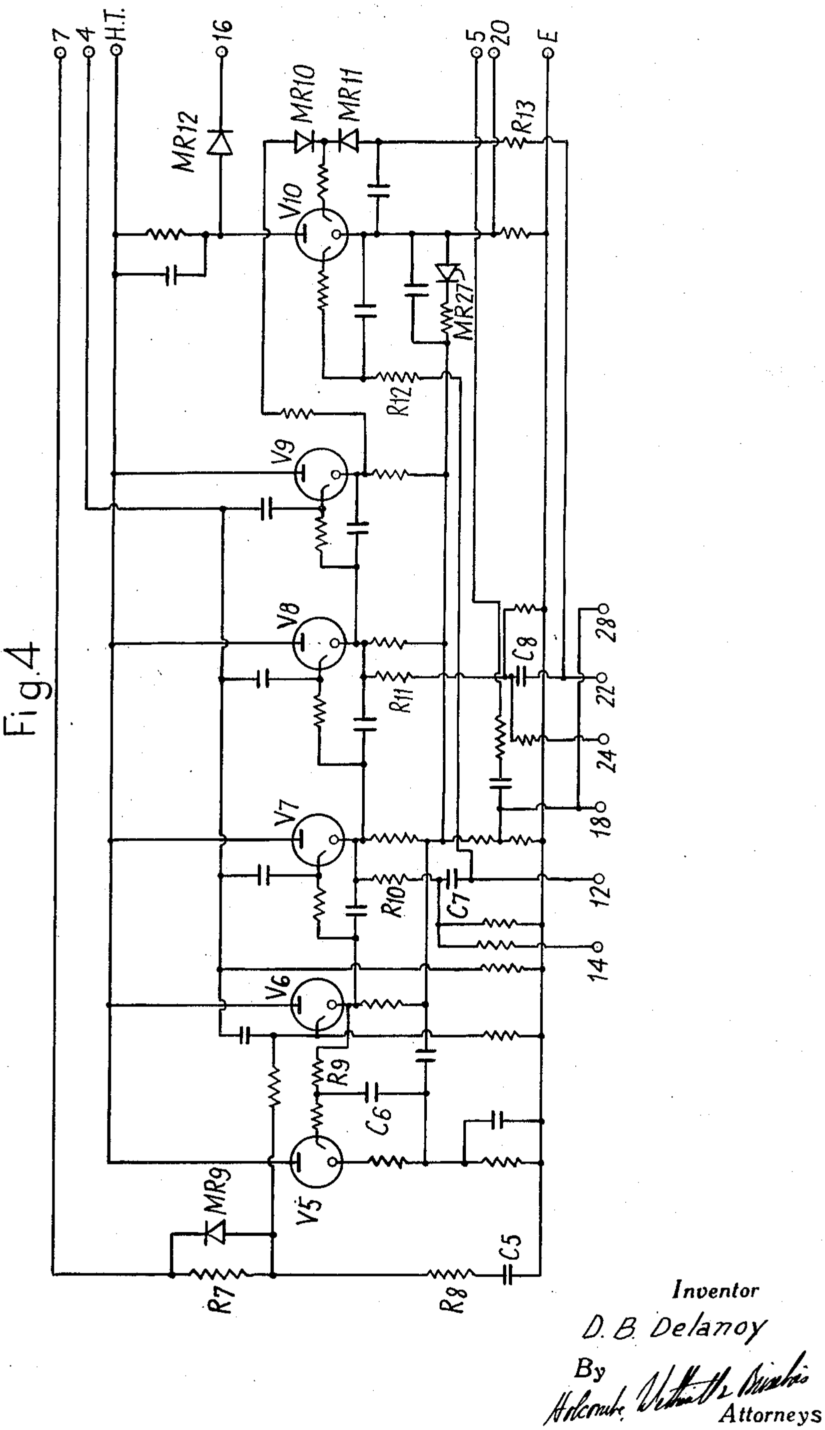
FIGURE 4 is a circuit diagram of the first register.

The first register, shown in FIGURE 4, and of which one is provided for each link as explained above, responds to the dialling pulses representing the first digit of a subscriber's number to be called and determines which level of the second register shall be primed to receive dialling pulses representing the second digit of the called subscriber's number.

The circuit consists of six cold cathode gas discharge tubes of which V5 is a self-extinguishing tube, V6 to V9 form a broken ring counter and V10 constitutes a control tube. Dialling pulses are applied to the triggers of V6 to V9 through terminal 4. The trigger of tube V6 is primed via terminal 7 from the anode of the main clearing tube V31 in the link control circuit through a network comprising R7, R8, C5 and MR9 constituting a fast discharge, slow charge time constant. This connection ensures that the priming potential is removed from V6 when the clearing circuit operates so as to prevent false triggering of V6 due to transients on release.

In the embodiment being described the first digit of a subscribers number is either 2 or 3 and therefore two parts are provided to the second register, one of which is designated "level 2" and the other of which is designated "level 3." The cathode of tube V7 is connected to the second register level 2 through terminals 14, 12 and 18 and the cathode of tube V8 is connected to the second register level 3 through terminals 24, 22 and 28. It will be understood that should there be a greater number than twenty subscribers it would be necessary to provide a greater number of levels to the second register, one for each additional first digit used for subscribers number and also that additional tubes, one for each additional digit, would be included in the ring counter of the first register between V8 and V9.

The operation of the circuit will now be considered upon dialling either the number 1, 2, 3 or a number greater than 3 for the first digit.

*Dialling 1*

Upon the dialling pulse being applied to the trigger of V6 from terminal 4, this tube will strike and charge up the time constant R9, C6 which when charged strikes tube V5. This tube is arranged in a self-extinguishing circuit and produces a pulse on its cathode which is applied to extinguish tube V6. The circuit releases within 0.2 of a second. No output is produced from the first register. This is also the action of the circuit in response to spurious pulses.

*Dialling 2*

The first dialling pulse strikes tube V6 in the manner described above and the second dialling pulse extinguishes V6 and strikes V7. The second dialling pulse arrives 100 milliseconds after the first dialling pulse which is before the time constant R9, C6 has charged up sufficiently to strike V5. V7 remains struck and the output is taken from its cathode through terminal 14 to prime the trigger of V11 in the second register level 2.

*Dialling 3*

The first two dialling pulses strike V6 and V7 as described above and the third dialling pulse strikes V8. The time constant circuit R10 and C7 in the cathode of V7 serves to prevent the first tube of the second register level 2 being struck as the dialling impulses pass through V7. When V8 strikes an output is taken from its cathode through terminal 24 to prime the trigger of the first tube in the second register level 3.

*Dialling a number greater than 3*

If the number 4 or a higher number is dialled, the first three dialling pulses operate the circuit as above described and the fourth dialling pulse operates to strike tube V9. The time constant circuit R11, C8 in the cathode of tube V8 prevents the first tube of the second register level 3 being struck as the pulses pass therethrough. The striking of tube V9 in turn strikes V10 through MR10 which operates to extinguish tube V9.

The cathode condensers C7 and C8 of tubes V7 and V8 are connected to the cathodes of the first tube of the associated level of the second register through terminals 12 and 22 respectively instead of to the earth terminal of the first register. This is done in order to prevent the second register tubes re-striking after they have been extinguished due to the charge on the condensers.

The subsequent dialing pulses representing the second digit of a called subscribers number operate the selected level of the second register. The first pulse will also strike tube V8 or V9 depending upon the selected level of the second register and also tube V10 will be struck when the first tube of the selected level of the second register is struck, either through R12 to the left-hand trigger of V10 for level 2 or through diode MR11 and R13 to the right-hand trigger for level 3. When tube V10 is struck, a D.C. voltage is fed on to the common cathode line through MR27 in order to hold the cathodes of tubes V6 to V9 sufficiently to positive prevent V6 again striking on receipt of subsequent pulses of the pulse train representing the second digit. V10 is extinguished by means of a pulse received on terminal 20 from the cathode of V32 in the link control circuit.

Tube V10 also operates in conjunction with diode MR12 connected to its anode and via terminal 16 to the associated coupling circuit, to control the application of the engaged tone to a calling subscriber. Diode MR13 in the coupling circuit (FIGURE 3) is normally non-conducting due to the positive bias applied through MR12, and therefore the engaged tone fed from the tone and pulse generator via terminal 29 is not normally passed to the subscriber. However if an engaged subscriber is dialled, tube V10 in the first register is not extinguished since tube V32 in the control circuit has not struck and therefore no pulse is applied to release the first and second registers. MR12 is non-conducting and the potential at the cathode of rectifier MR13 in the coupling circuit is lowered sufficiently for it to conduct and pass the engaged tone through the transformer to the calling subscriber.

Terminal 5 is connected to the cathode of the register clearing tube V32 in the link control circuit, and receives a pulse which is applied via terminals 18 and 28 respectively to release level 2 and level 3 of the second register.

*Second register*

Figure 5:
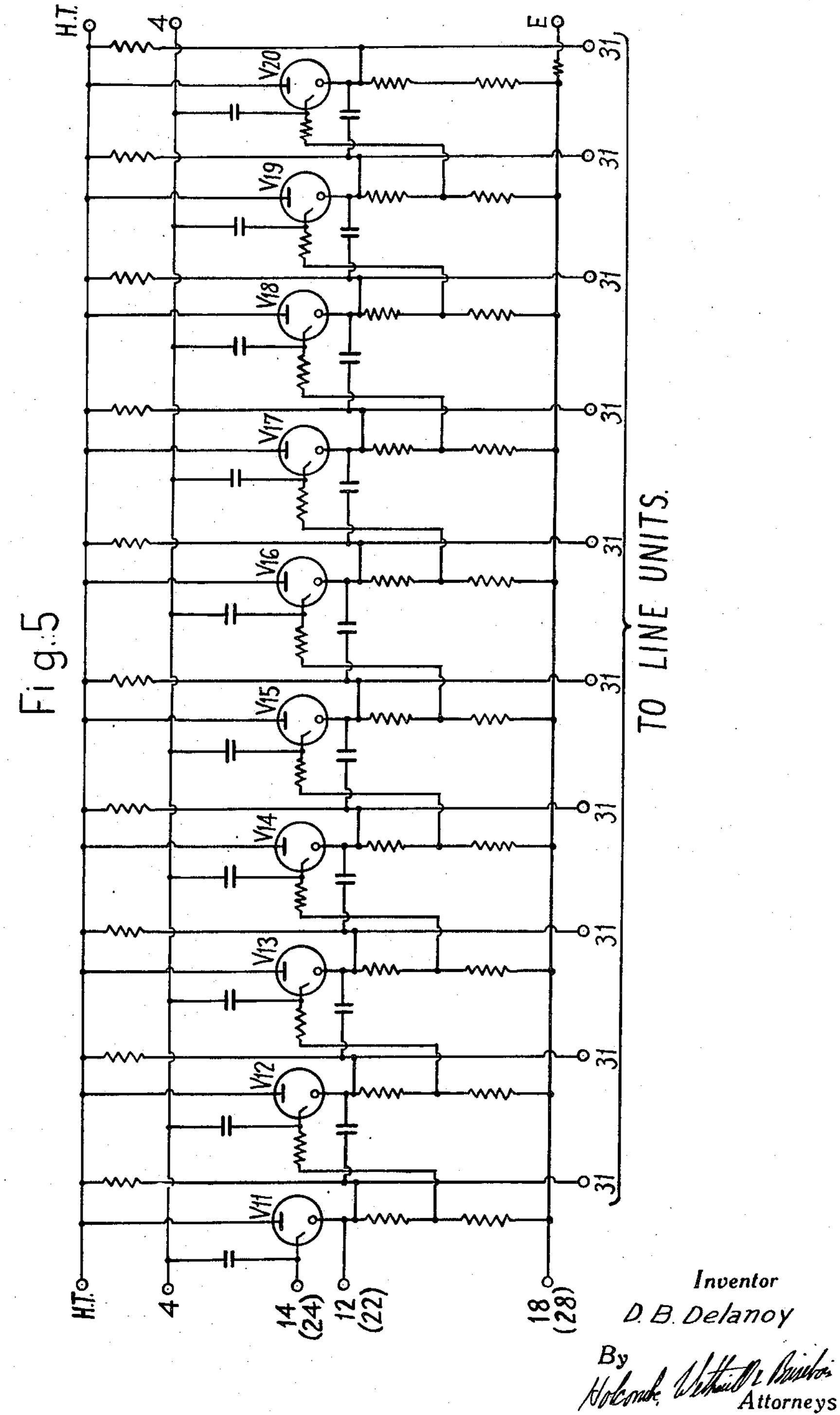
FIGURE 5 is a circuit diagram of one level of the second register.

FIGURE 5 shows one level of the second register comprising tubes V11 to V20 arranged in a ring counter circuit. A similar circuit is provided for each of the two levels of the second register and the circuits are respectively connected to the outputs from V7 and V8 in the first register.

As already explained, the trigger of V11 of the ring counter is primed via terminal 14 or 24 by the voltage obtained from the cathode of the associated tube (V7 or V8) of the first register when that tube strikes. The dialling impulses representing the second digit of a subscribers number and applied via terminal 4 will now strike the tubes of the ring counter in succession until the tube representing the second digit is struck by the last impulse. For example if 5 is dialled as the second digit, successive pulses will strike V11, V12, V13, V14 and V15 in succession, the last tube remaining struck. The striking of tube V15 will in turn strike the appropriate link tube in the called subscribers line unit, which is connected to the link on which the calling subscriber is working, provided that the called subscriber is not engaged. The pulse from the second register tube which is struck is applied through terminal 31 to the left-hand trigger of the appropriate link tube in the line unit. If the called subscriber is engaged, the arrangement is such that the engaged tone is fed from tube V10 of the first register to the calling subscriber as has previously been described in connection with FIGURE 4.

*Tone and pattern generators*

This circuit, shown in FIGURE 6, consists of two cold cathode gas discharge tubes V21 and V22 and a transistor T1. Tubes V21 and V22 are connected in a free running multivibrator circuit producing a series of square pulses of a duration one second on, one second off, forming the pattern controlling the ringing current generator. This ringing pattern is applied via terminal 11 to each of the subscribers line units. The seventeen cycles per second ringing current is applied to terminal 8. An output is also taken from the anode of tube V21 through terminal 17 to the allotter circuit for triggering purposes as will hereinafter be explained.

The pulse pattern produced by V21 and V22 is also applied to control the engaged tone oscillator T1. The arrangement is such that when V22 is struck and the potential drops at its anode, transistor T1 conducts and oscillates, but when tube V22 is extinguished its anode potential raises and biasses off transistor T1. The output from the engaged tone oscillator is fed through transformer TR3 and terminal 29 to the coupling circuit for each link in order that the engaged tone may be passed to a calling subscriber when the number he is calling is engaged, by the action of tube V10 in the first register as has already been described. A further winding of transformer TR3 is connected across terminals 2 and 30. Terminal 2 is connected to the base of transistor T3 in the busy circuit and terminal 30 is connected to the anode of rectifier MR8 in each of the twenty subscribers units. This circuit is employed to give the engaged tone to a subscriber if all of the links in the exchange are engaged, as will be described in connection with the busy circuit (FIGURE 8).

Since the trigger electrode of tube V22 is fed through a very long time constant consisting of R14 and C9 the trigger potential will rise very slowly and there is a risk of corona breakdown occurring within the tube between the trigger and cathode. If this occurs, the tube will be prevented from striking properly between anode and cathode since the current drawn through the resistance R14 connected in series with the trigger will cause a voltage drop which prevents the trigger electrode from ever rising sufficiently high to allow sufficient transfer current to flow to cause anode to cathode breakdown. In order to avoid the risk of this undesirable condition occurring, a proportion of the seventeen cycle ringing frequency voltage is applied through condenser C10 as a ripple voltage superimposed upon the D.C. voltage applied to the trigger of tube V22. This prevents the occurrence of corona breakdown between trigger and cathode of the tube, since the ripple voltage produces a sufficiently rapid rate of rise of the trigger potential to cause the tube to strike properly between anode and cathode.

*The link allotter*

Figure 7:
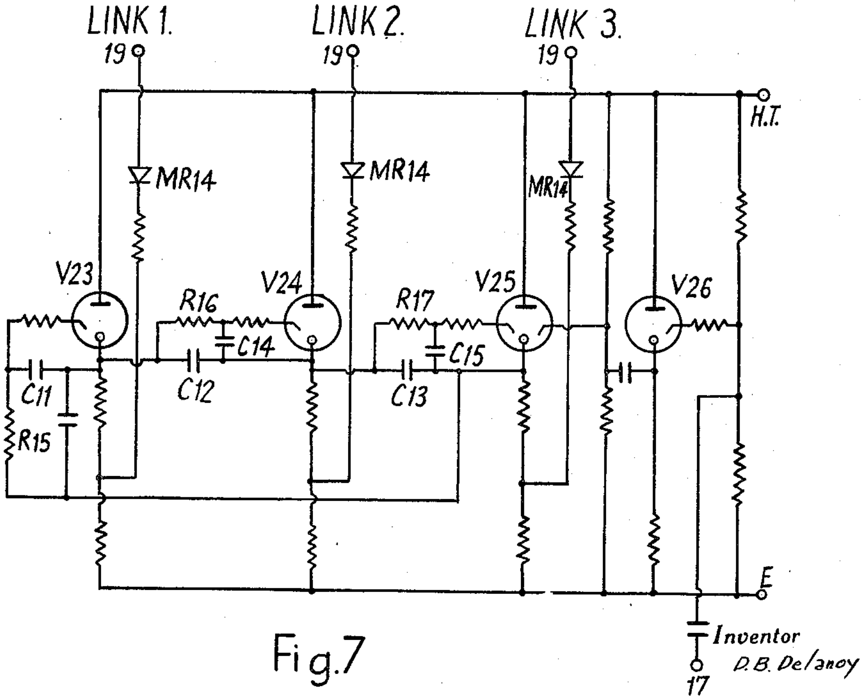
FIGURE 7 is a circuit diagram of the link allotter.

The link allotter, shown in FIGURE 7, operates to apply a priming voltage in sequence to the right-hand trigger electrodes of the three groups of twenty link tubes in the line units in order to prime these tubes ready for striking if any subscriber wishes to call another subscriber. The circuit comprises three tubes V23, V24 and V25 arranged in a closed ring counter and a starting tube V26. A positive pulse fed via terminal 17 from the anode of V21 in the pattern generator is applied to the trigger of tube V26 to strike this tube and the positive pulse at its cathode is applied to the right-hand trigger of tube V25 to strike this latter tube. V26 remains struck to prevent subsequent pulses applied over terminal 17 having any effect upon the ring of tubes V23, V24 and V25. When V25 strikes, it charges condenser C11 through resistor R15 and strikes tube V23. A pulse from the cathode of V23 is applied through condensers C11, C12 and C13 to extinguish tube V25. When C14 is charged through R16, tube V24 strikes and in turn extinguishes tube V23. The charging of C15 through R17 again strikes V25 and extinguishes V24. The tubes are therefore struck in turn and positive potentials appear at the cathodes of the tubes V23, V24 and V25 in succession. These positive potentials are applied in turn to cut off the three clamping diodes MR14 connected to terminals 19 which are in turn respectively connected to the diode MR19 in the associated link control circuit and from thence to the right-hand triggers of the twenty tubes in the line units which are connected to the associated link through terminal 3. As each clamping diode MR14 is cut off the potential on the right-hand trigger of each of the twenty tubes in the line units connected to that link rises to prime these tubes. The arrangement is such however that the positive voltage can only become effective to prime the tubes connected to a link if V27 in the link control circuit (FIGURE 9) is also struck. At other times when V27 is extinguished, terminal 19 is clamped towards earth potential and in fact held at 20 volts, by rectifier MR19 in the control circuit. V27 in the control circuit is extinguished when a link is seized in order to prevent the further priming of tubes on that link. The allotter however still cycles round producing the positive potentials sequentially at the cathodes of V23, V24 and V25.

*Busy circuit*

The busy circuit, shown in FIGURE 8 operates when the three links are already engaged and a further subscriber lifts his telephone hand set, so as to prevent the lowering of the cathode potential of the link tubes in his line unit to a value which would otherwise allow one of these tubes to strike on passing dialling pulses and thereby connect him to one of the engaged links. The circuit basically consists of three transistors T2, T3 and T4 and an OR gate comprising three diodes MR15, MR16 and MR17 connected to the base of the first transistor. So long as any of the three links are available, a positive potential is fed via terminal 1 from the cathode of V27 in the link control circuits and through at least one of the diodes to the base of transistor T2. The emitter is only at +20 volts and therefore this transistor is cut off and the cathode of the link tubes in any of the line units can go negative as a subscriber lifts his hand set to make a call. However, once all of the links are engaged the positive potential applied from the link control circuits is not present as tube V27 is extinguished, thereby allowing transistor T2 to conduct which tends to clamp the top of resistor R18 to earth by virtue of the diode MR18. If a subscriber now picks up his receiver to make a call the cathode line of his link tubes cannot go fully negative as diode MR18 is conducting. However, some negative voltage is applied over terminal 2 from terminal 30 in the subscribers line unit and through the winding on transformer TR3 in the engaged tone generator, which carries the base of transistor TR3 negative to its emitter and allows this latter transistor to conduct. The negative voltage at the cathode of the subscribers link tubes V1, V2 and V3 makes diodes MR7 and MR8 in the subscribers unit conduct to pass the engaged tone to the subscriber from the winding of transformer TR3 connected to terminal 30. It will be appreciated that none of the subscribers link tubes is being primed by the allotter circuit since all links are engaged and that therefore none of tubes V1, 2 or 3 will strike.

When T3 conducts it cuts off transistor T4 which was previously conducting. The negative 55 volt potential at the collector of transistor T4 now holds the base of transistor T2 negative and the circuit constants are so chosen that even if a link should now become free, thereby rendering one of the diodes of the OR gate conducting, the base of transistor T2 is still held negative as transistor T4 is cut off. The subscriber attempting to make a call can only therefore seize the free link by first replacing his hand set to cut off transistor T2 and allow T4 to conduct again. Therefore if a calling subscriber receives the engaged tone as soon as he lifts his receiver, he must first replace the receiver before he can again attempt to seize a link to make a call.

*Link control circuit*

Figure 9:
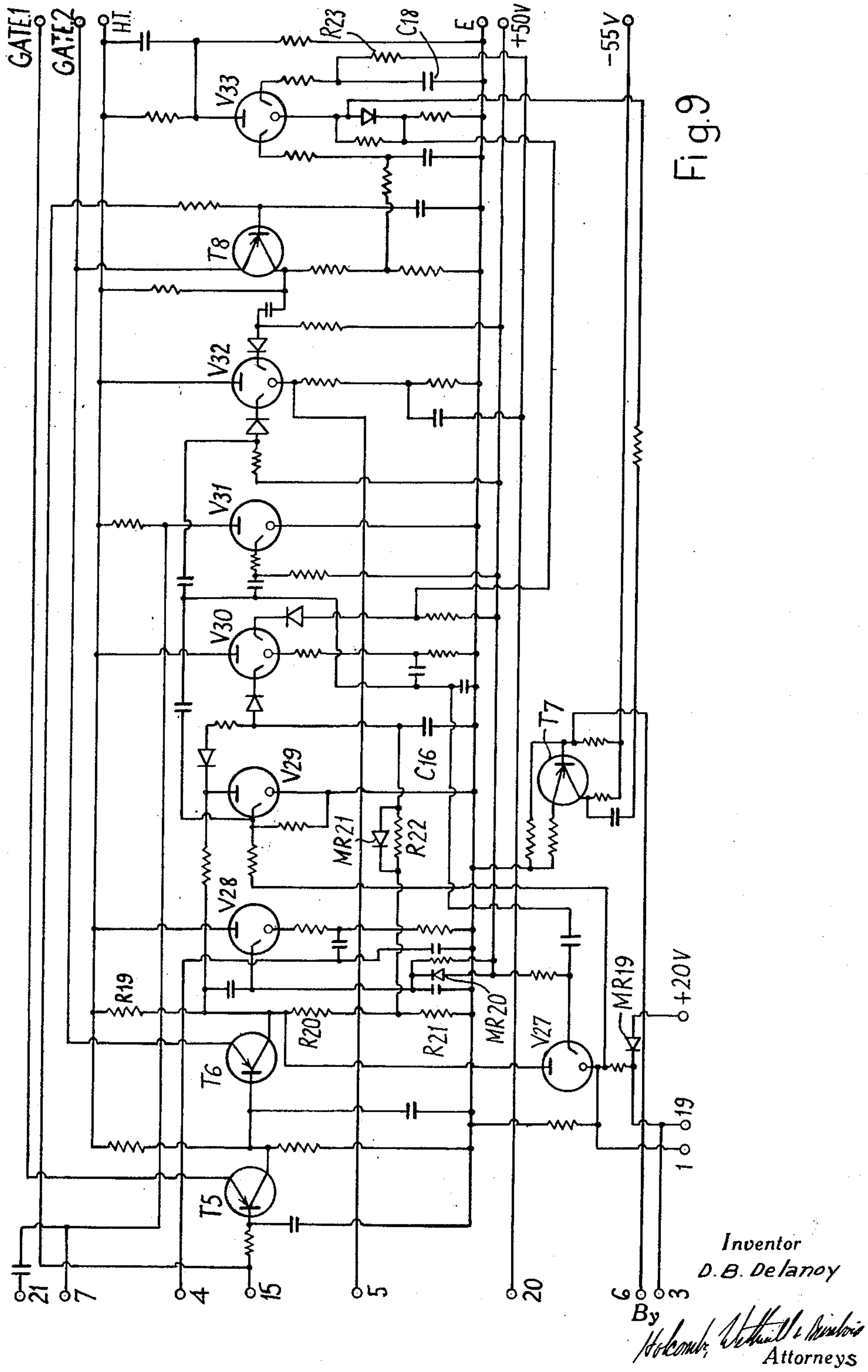
FIGURE 9 is a diagram of the link control circuit.

FIGURE 9 shows the link control circuit which is operated by changes in potential occurring across the sense resistor R6 in the coupling circuit (FIGURE 3) and itself controls the condition of the circuits on the link to which it is connected. Basically the circuit comprises seven cold cathode gas discharge tubes V27 to V33 and four transistors T5 to T8. When the circuit is switched on and in the quiescent condition, i.e. when all the subscribers telephone hand sets on that link are in the rest position, tubes V27 and V29 are struck and transistor T6 is conducting.

The gate 1 potential is applied to the emitter of transistor T5 and the gate 2 potential is applied to the emitter of transistor T8. This latter potential is also applied to the emitter of transistor T6 but in this case it merely constitutes a convenient potential for the emitter. Both the gate potentials are derived from the voltage supply network of FIGURE 11.

Figure 10:
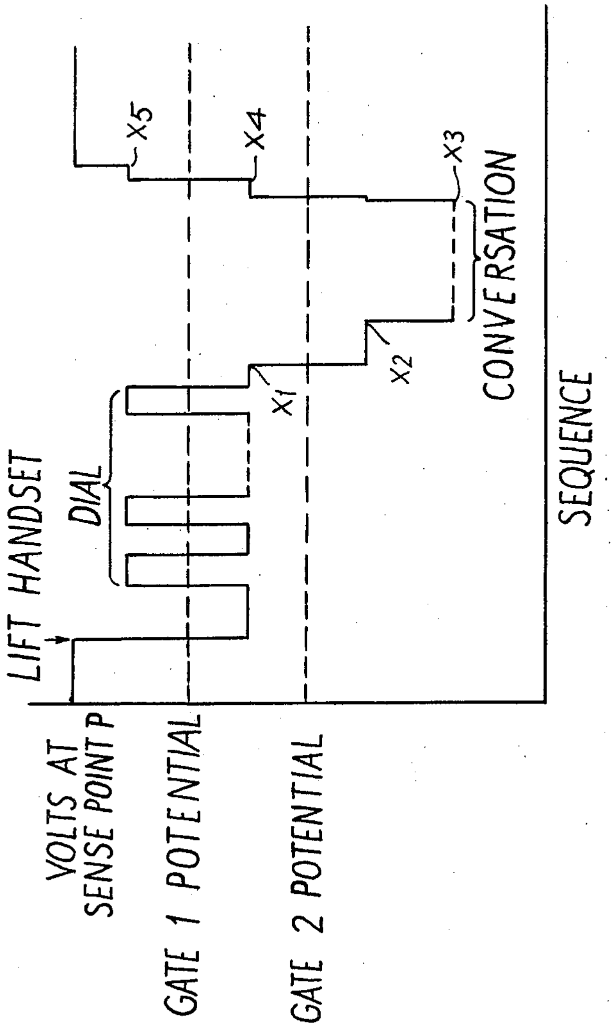
FIGURE 10 is a graph illustrating changes in potential applied from the coupling circuit to operate the link control circuit.

The operation of the circuit will now be explained and understanding thereof will be facilitated by making reference also to FIGURE 10 illustrating the changes in potential across the sense resistor R6. Assuming that the link with which the control circuit is associated is not engaged, when a subscriber picks up his telephone hand set the voltage at the sense point P in the coupling circuit of FIGURE 3 falls below the first gate potential and is applied through terminal 15 from the coupling circuit to the base of transistor T5. Since this transistor has the first gate potential applied to its emitter, it will now conduct and in turn cut off transistor T6 which was previously conducting. The collector potential of transistor T6 now falls to a value determined by resistors R19, R20 and R21 which has the effect of extinguishing tubes V27 and V29 whose anodes are connected to this collector. When tube V27 is extinguished the priming voltage controlled by the link allotter circuit on terminal 19 is no longer applied to the right-hand triggers of those link tubes in the other line units which are connected to that link, as has already been described with reference to the allotter circuit (FIGURE 7), since rectifier MR19 conducts to hold terminal 19 at +20 volt potential. This arrangement eliminates the risk of anode/trigger breakdown of a link tube if any other subscriber is releasing on another link at that instant. V29 is a clamp tube which when struck prevents V30 from striking.

When the calling subscriber commences to dial, the dialling impulses cause changes in potential at the sense point which brings the voltage at the base of transistor T5 above the gate 1 potential so that this transistor is alternatively switched on and off and transistor T6 is therefore switched off and on in accordance with the dialling pulses. Tube V28 strikes in accordance with the switching of transistor T6 and the dialling pulses are fed out from the cathode of this tube to terminal 4 from where they are applied to the first and second register circuits (FIGURES 4 and 5). Diode MR20 serves to arrest the negative-going differentiated spikes at the collector of transistor T6. The network R22, MR21 and C16 form a slow charge quick discharge time constant circuit which prevents V30 from striking during the dialling pulses by avoiding an exponential rise in the potential at the left-hand trigger of tube V30. Upon completion of the sequence of dialling pulses the called subscribers link tube will strike (point XI in FIGURE 10) assuming that the called subscriber is free, and his telephone bell will ring as described with reference to FIGURE 2. The striking of his link tube reduces the voltage at the sense point P to below the gate 2 potential and this further reduction in voltage is applied from terminal 15 to the base of transistor T8 whose emitter is connected to the gate 2 potential. Transistor T8 now conducts and the collector potential rises and is applied to the right-hand trigger of tube V32 which strikes and produces a positive pulse at its cathode which is applied via terminal 5 to extinguish the control tube (V10) in the first register. This also produces a priming voltage for the right-hand trigger of V33. An output is also taken from the cathode of V32 via a terminal 20 to extinguish the tube in the second register which was struck upon completion of the dialling pulse sequence for the called subscribers number. Tube V32 is self-extinguishing.

When the called subscriber picks up his telephone hand set to answer the call (point X2 in FIGURE 10), the potential at the sense point P drops still further but this has no further action upon the link control circuit since the potential has already previously fallen below the second gate potential.

Transistor T7 which constitutes an inverter amplifier stage is normally conducting and has its base connected through terminal 6 and condenser C17 in the coupling circuit to the sense point P. Whenever a positive pulse is applied to the base of transistor T7 the negative pulse produced at its collector is applied to the cathode of V33. This is a self-extinguishing tube which is primed by transistor T8 when this is made conducting and strikes upon a receipt of a negative pulse on its cathode from transistor T7 to produce a positive output at its cathode which is applied to strike tubes V30 and V31. Tubes V30 and V31 are also self-extinguishing tubes.

Now, when a conversation between two subscribers on the link has finished and one of the subscribers replaces his hand set (point X3 in FIGURE 10), the voltage at the sense point P moves in the positive direction producing a negative voltage at the collector of T7 which is applied to fire V33 whose left-hand trigger is already primed by T8, since this latter transistor is conducting. The positive pulse at the cathode of V33 is applied to the right-hand trigger of tube V30 which strikes and in turn strikes V31 producing the main release pulse which is applied through terminal 21 to the anodes of all the link tubes of the line units connected to that link and serves to release both subscribers line units. However unless both subscribers replace their hand sets substantially simultaneously, one of the tubes in the line unit for the subscriber who has not replaced his hand set will again strike to seize a link. Now, upon that subscriber replacing his hand set (point X4 in FIGURE 10) the potential at the sense point P rises above the gate 1 potential and T5 therefore cuts off and T6 is made conducting which has the effect of restriking V27, V29 and V30 (point X5 in FIGURE 10) to return the circuit to its initial condition. V29 only fires after V27 as V27 provides the bias to the trigger of V29. Therefore clamp tube V29 cannot clamp the trigger of V30 to prevent it striking until after V27 has struck.

Should a subscriber attempt to dial his own number or an engaged subscriber, tube V10 in the first register strikes and supplies a potential through terminal 20 and the long time constant circuits R23, C18, which is longer than the time taken to dial 0, to the right-hand trigger of tube V33. When the subscriber hangs up, so moving the voltage at the sense point positive, a negative output from the transistor amplifier T7 strikes tube V33 and hence tubes V30, V31 and V32 to effect the release of the circuits.

*Voltage supplies*

Figure 11:
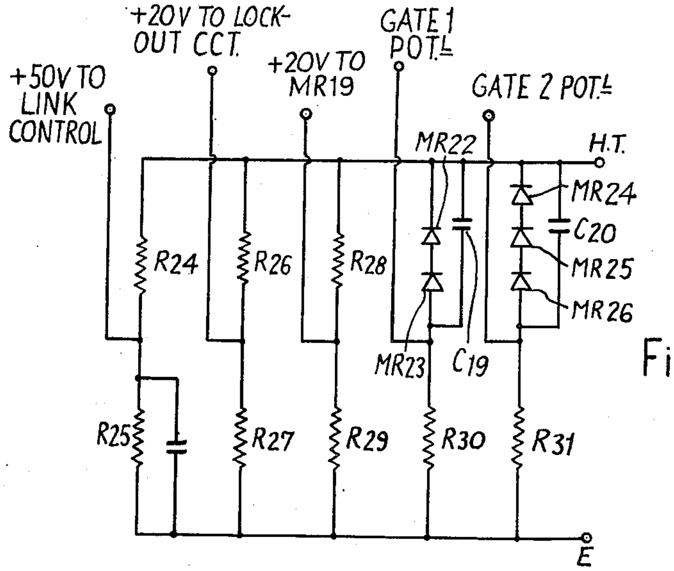
FIGURE 11 is a circuit diagram of a network producing some of the voltage supplies for the equipment.

FIGURE 11 shows a voltage supply network for supplying some of the exchange circuits and consisting of a series of potentiometers connected between the high tension positive and earth lines. Resistors R24 and R25 form a potentiometer from which a positive 50 volts supply is fed to the link control circuits. Resistors R26 and R27 form a potentiometer from which the +20 volts supply is fed to the busy circuit. Resistors R28 and R29 form a potentiometer from which the +20 volts priming voltage is derived which is fed to the diode MR19 in the link control circuit. Zener diodes MR22 and MR23 in series with resistor R30 and shunted by condenser C19 provide a voltage representing the gate 1 potential, whilst Zener diodes MR24, MR25 and MR26 in series with resistor R31 and shunted by condenser C20 provide the gate 2 potential.

The system may also include a guard circuit which is provided to remove the priming voltage from all of the links whenever a release operation occurs on any link. This prevents re-seizure of a link in the event of a telephone hand set bouncing on its rest whilst being replaced. The circuit may comprise a diode connected to each link which is normally cut off but which is rendered conducting for a short period, e.g. 1.5 seconds, during a release operation to clamp the priming circuit for each link to ground for this period. Thus no link can be primed for the 1.5 seconds period which does not affect any links already in use and only results in a delay of up to 1.5 seconds in seizing a link in the event of a subscriber attempting to make a call during the operation of the guard circuit.

In a modification of the busy circuit, the emitter of transistor T2 is connected to earth and the base of transistor T4 is connected to the +20 volts supply. Also diode MR18 is connected directly to the base of transistor T3. This modified arrangement produces a more positive busy action particularly if several subscribers lift their hand sets simultaneously whilst all the links are engaged.

In a modification of the first register circuit, the priming of V6 is no longer effected from the link control via terminal 7. Instead, V6 may be primed by a simple potential divider from the HT supply, or alternatively from the anode of V10. An additional tube may also be included in the circuit to ensure more uniform operation when any subscriber attempts to call another subscriber who is already engaged. The additional tube is fired from V10, which itself is fired by the first dialling pulse of the second digit, via a delay circuit which is longer than the time required to dial any number in the second register. The additional tube is self-extinguishing and feeds a pulse to the second registers to ensure that they release at the end of the call already taking place. A rectifier is required to stop this pulse from the additional tube passing through the register and back to release V10.

In a modification of the link control circuit, the transistor circuit T7 is arranged to operate as a pulse shaper instead of as an inverter and is normally non-conducting because of a low impedance circuit between the emitter and base. Its collector is connected to earth via a load impedance and positive output pulses are obtained which are fed to the trigger electrode of V33 to strike this tube (instead of the previously described arrangement which fed a negative pulse to the cathode of that tube). The emitter and base of the transistor pulse shaper are connected to the sense point P via delay circuits, the time constant of the base circuit being substantially longer than the time constant of the emitter circuit. No output can occur if the sense point moves in a negative direction and any transient positive pulse will be blocked as the integration of the pulse at the emitter by its time constant circuit prevents an output pulse appearing in the collector circuit. When the sense point goes positive, the emitter is carried momentarily positive with respect to the base and the transistor will conduct until equilibrium is re-established. Thus an output pulse appears at the collector.

In a further modification, V28 is primed from the anode of V31 through a long time constant which produces an improved operation of the release of the circuits if a subscriber attempts to dial his own number or an engaged subscriber.

It will be understood that although in the specification and claims reference is generally made to a subscriber lifting or replacing his hand set when commencing or finishing a call, any other equivalent operation to control the microphone circuits is also intended to be included within the scope of the claims if a subscriber's telephone receiver is of other than conventional type.

I claim:

1. An automatic telephone exchange system comprising a plurality of subscribers' telephones and a plurality of links to each of which any two subscribers' telephones can be selectively connected to provide a communication channel between them over that link, wherein a separate cold cathode gas discharge tube is provided for connecting the speech circuit for each subscribers' telephone to each of the links, and including circuit means so that upon any subscriber commencing to call another subscriber, for example by the calling subscriber lifting his telephone hand set, the tube connecting the speech circuit of the calling subscriber's telephone to one of the links strikes and upon the called subscriber's telephone number or other identifying code being dialled, the tube connecting the speech circuits of the called subscriber's telephone to the same link strikes thereby completing the speech circuits between the subscribers through the two struck tubes when the called subscriber answers the call, for example by lifting his hand set, each of said cold cathode gas discharge tubes which is connected between a subscriber's telephone and the links having two trigger electrodes, an allotting circuit provided to prime one of the trigger electrodes of each tube at intervals and means for causing an alteration of potential across the tubes connected to the links when one subscriber lifts his hand set to call another subscriber, so that the first tube which is primed by the allotting circuit after the calling subscriber has lifted his hand set will then strike to connect the calling subscriber to one of the links and means connecting the other trigger electrode of each tube to the links and for applying a potential which is sufficient to strike that tube when the subscriber connected thereto is being called by another subscriber.

2. A system as claimed in claim 1, in which the allotting circuit consists of a ring counter comprising a plurality of cold cathode gas discharge tubes equal to the number of links in the exchange, each of which tubes controls the priming of all of the tubes which serve to connect all the subscribers to any one link.

3. A system as claimed in claim 2, in which the allotter circuit includes a starting tube for initiating the operation of the ring counter and for isolating the counter from the influence of external pulses once the counter has commenced operation and a separate clamping diode connected from each of the tubes of the counter to the trigger electrode of all of the tubes which serve to connect the subscribers to one of the links.

References Cited by the Examiner

UNITED STATES PATENTS

| | | | |
|---|---|---|---|
| 2,315,705 | 4/43 | Holden et al. | 179—18 |
| 2,694,752 | 11/54 | Wright et al. | 179—18 |
| 2,755,340 | 7/56 | Oberman | 179—18 |
| 2,779,822 | 1/57 | Ketchledge | 179—18 |
| 2,854,521 | 9/58 | Morris et al. | 179—18 |
| 2,905,765 | 9/59 | Treskinky | 179—18 |
| 2,933,562 | 4/60 | Jabczynski | 179—18 |
| 2,936,402 | 5/60 | Ketchledge | 179—18 |
| 2,960,575 | 11/60 | Bray et al. | 179—18 |
| 3,053,935 | 9/62 | Benmussa et al. | 179—18 |
| 3,060,270 | 10/62 | Cerofolini | 179—18 |

ROBERT H. ROSE, *Primary Examiner.*